(12) United States Patent
Alekseev et al.

(10) Patent No.: US 11,237,186 B2
(45) Date of Patent: Feb. 1, 2022

(54) WIDE-FIELD SCANNING PROBE MICROSCOPE COMBINED WITH AN APPARATUS FOR MODIFYING AN OBJECT

(71) Applicant: CHASTNOE UCHREZHDENIE "NAZARBAYEV UNIVERSITY RESEARCH AND INNOVATION SYSTEM", Astana (KZ)

(72) Inventors: Alexander Mihaylovich Alekseev, Astana (KZ); Aleksey Dmitrievich Volkov, Astana (KZ); Dmitry Yurjevich Sokolov, Moscow (RU); Anton Evgenievich Efimov, Moscow (RU)

(73) Assignee: Chastnoe Uchrezhdenie Nazarbayev University Research and Innovation System, Astana (KZ)

( * ) Notice: Subject to any disclaimer, the term of this patent is extended or adjusted under 35 U.S.C. 154(b) by 565 days.

(21) Appl. No.: 16/302,142

(22) PCT Filed: May 18, 2017

(86) PCT No.: PCT/KZ2017/000011
§ 371 (c)(1),
(2) Date: Dec. 6, 2018

(87) PCT Pub. No.: WO2017/200364
PCT Pub. Date: Nov. 23, 2017

(65) Prior Publication Data
US 2019/0219610 A1    Jul. 18, 2019

(30) Foreign Application Priority Data
May 18, 2016 (KZ) ............................. 2016/0436.1

(51) Int. Cl.
*G01Q 30/20* (2010.01)
*G01Q 10/04* (2010.01)

(52) U.S. Cl.
CPC .............. *G01Q 30/20* (2013.01); *G01Q 10/04* (2013.01)

(58) Field of Classification Search
CPC ...... G01N 1/06; H01J 37/20; H01J 2237/206; H01J 2237/226; H01J 2237/24495; H01J 2237/24578
See application file for complete search history.

(56) References Cited

U.S. PATENT DOCUMENTS

| 2012/0223228 | A1 | 9/2012 | Galloway |
| 2017/0067800 | A1* | 3/2017 | Briggman ............. G01N 23/225 |
| 2017/0350921 | A1* | 12/2017 | Alekseev ................ G01Q 30/20 |

FOREIGN PATENT DOCUMENTS

| EP | 2482080 | 8/2012 |
| RU | 2282257 | 8/2006 |

(Continued)

OTHER PUBLICATIONS

International Search Report PCT/KZ2017/000011 2 pages.
(Continued)

*Primary Examiner* — David E Smith
*Assistant Examiner* — Hsien C Tsai
(74) *Attorney, Agent, or Firm* — The Roy Gross Law Firm, LLC; Roy Gross

(57) ABSTRACT

The invention relates to the field of probe measurements of objects after micro- and nano-sectioning. The essence of the invention consists in that in a wide-field scanning probe microscope combined with an apparatus for modifying an object, said microscope comprising a base on which a piezo-scanner unit having a piezo scanner, a probe unit having a probe holder, and a punch unit having a punch are
(Continued)

movably mounted, a punch actuator is configured as a three-axis actuator, allowing the punch to move along a first axis X, a second axis Y and a third axis Z; and the probe unit is mounted on the punch actuator. The invention is aimed at simplifying the structure of the device by combining into one unit means for measuring and means for modifying an object. The technical result of the invention consists in increasing measurement resolution.

5 Claims, 3 Drawing Sheets

(56) References Cited

FOREIGN PATENT DOCUMENTS

| RU | 2008130494 | 2/2010 |
|---|---|---|
| RU | 2012102492 | 3/2014 |

OTHER PUBLICATIONS

Written Opinion of the International Searching Authority PCT/KZ2017/000010 4 pages.
Written Opinion of the International Searching Authority PCT/KZ2017/000011 4 pages.

* cited by examiner

WIDE-FIELD SCANNING PROBE MICROSCOPE COMBINED WITH AN APPARATUS FOR MODIFYING AN OBJECT

RELATED APPLICATIONS

This application is a National Phase of PCT Patent Application No. PCT/KZ2017/000011 having International filing date of May 18, 2017, which claims the benefit of priority of Kazakhstan Application No. 2016/0436.1 filed on May 18, 2016. The contents of the above applications are all incorporated by reference as if fully set forth herein in their entirety.

The invention relates to the field of probe measurements of objects after their micro-/and nano-cutting.

A scanning probe microscope is known that is combined with a device for modifying the surface of an object and comprises a base on which a piezo scanner unit is mounted which has the capability of functional movement, with a piezo scanner having a longitudinal axis 0-01 disposed along the first coordinate X, wherein an object holder with object is secured on the piezo scanner, said object having a measurement surface disposed in the plane of the second coordinate Y and third coordinate Z. Mounted on the piezo scanner unit with the capability of movement along the first coordinate X is a probe unit with probe holder in which a probe is secured having the capability of interacting with the measurement surface of the object. Also mounted on the base is a punch unit with punch having a cutting edge which is disposed on the two-coordinate drive of the punch. In this case the cutting edge is disposed along the second coordinate Y and has the capability of interacting with the object. The piezo scanner has the capability of moving the object holder along the first coordinate X, along the second coordinate Y and along the third coordinate Z and provides for scanning of an object in the plane of the second-quarter net Y and third coordinate Z and also provides for its movement along the first coordinate X [EP 2482080 A1]. In one of the variants the scanning probe microscope combined with feed device for modifying the surface of an object can be equipped with a cryo-chamber.

The chief disadvantage of this device is that the modification of the surface of the object is implemented during movement of the piezo scanner unit, which includes the probe unit. This moving module has a significant mass and low natural resonance frequencies which results in a reduction in quality of the modified surface of the object because of its non-functional oscillations in the process of modification of the object, and as a result leads to a reduction in resolution of the measurements.

A scanning probe microscope is known that is combined with a device for modifying the surface of an object and comprises a base on which a piezo scanner unit is mounted with the capability of functional movement, with a piezo scanner having the longitudinal axis 0-01 disposed along the first coordinate X, wherein an object holder with object is secured on the piezo scanner, said object having a measurement surface disposed in the plane of the second coordinate Y and third coordinate Z; also mounted on the base is a probe unit with probe holder in which a probe is secured having the capability of interacting with the measurement surface of the object; also mounted on the base is a punch unit with punch having a cutting edge, which is disposed on a two-coordinate drive of the punch, wherein the cutting edge is disposed along the second coordinate Y and has the capability of interacting with the object, the piezo scanner having the capability of moving the object holder along the first coordinate X, along a second coordinate Y, and along a third coordinate Z and provides for scanning of the object in the plane of the second coordinate Y and the third coordinate Z, and also provides for its movement along the first coordinate X [patent RU 2389032]. This device is selected as the prototype of the proposed solution.

The disadvantage of this solution is that the known device has low resolution of measurements which is related to the reduction of resonance frequencies of the piezo scanner when there is an increase in the zone of examination on the object. Apart from that the functional slide (for cutting of the object) of the piezo scanner unit reduces the rigidity of the structure which leads to non-functional movement of the object relative to the probe during measurements of the object and also reduces resolution of the measurement.

The object of the invention is to simplify the structure of the device by combining the measurement systems and the object modification systems into a single unit.

The technical effect to the invention is to raise the resolution of the measurements.

This technical effect is achieved in that, in a widefield scanning probe microscope combined with a device for modifying an object, comprising a base on which a piezo scanner unit with piezo scanner having the longitudinal axis 0-01, disposed along the first coordinate X, wherein in object holder with object is mounted on the piezo scanner and has a measurement surface disposed in the plane of the second coordinate Y and third coordinate Z, also comprising a probe unit with probe holder in which a probe is secured having the capability of interacting with the measurement surface of the object, a punch unit with punch also being mounted, having a cutting edge, is mounted on a punch drive, wherein the cutting edge is disposed along the second coordinate Y and has the capability of interacting with the object, the piezo scanner having the capability of movement of the object holder with object along the first coordinate X, the second coordinate Y, and the third coordinate Z, and providing scanning of the object in the plane of the second coordinate Y and third coordinate Z, and also providing its movement along the first coordinate X, the punch drive being designed as a three-coordinate component and providing movement of the punch along the first coordinate X, the second coordinate Y, and the third coordinate Z, the probe unit being mounted on the punch drive.

There is a variant in which the punch drive comprises a first module for movement along the first coordinate X, a second module for movement along the second coordinate Y, and a third module for movement along the third coordinate Z, mounted with the capability of disconnecting from one another.

There is a variant in which a first turning module is incorporated in the device in the plane of coordinates XZ, and is mounted on the base, wherein the punch drive is secured on the first turning module in the plane of the coordinates XZ.

There is a variant in which the piezo scanner unit is mounted on a base with the capability of adjustment movement, which is provided by the second turning module in the plane of coordinates XZ There is a variant in which a magnetic insert is incorporated in the device, mounted in the punch unit, and an electromagnet which is mounted on the base, wherein the magnetic insert is coupled to the electromagnet by the magnetic field.

Figure 1:
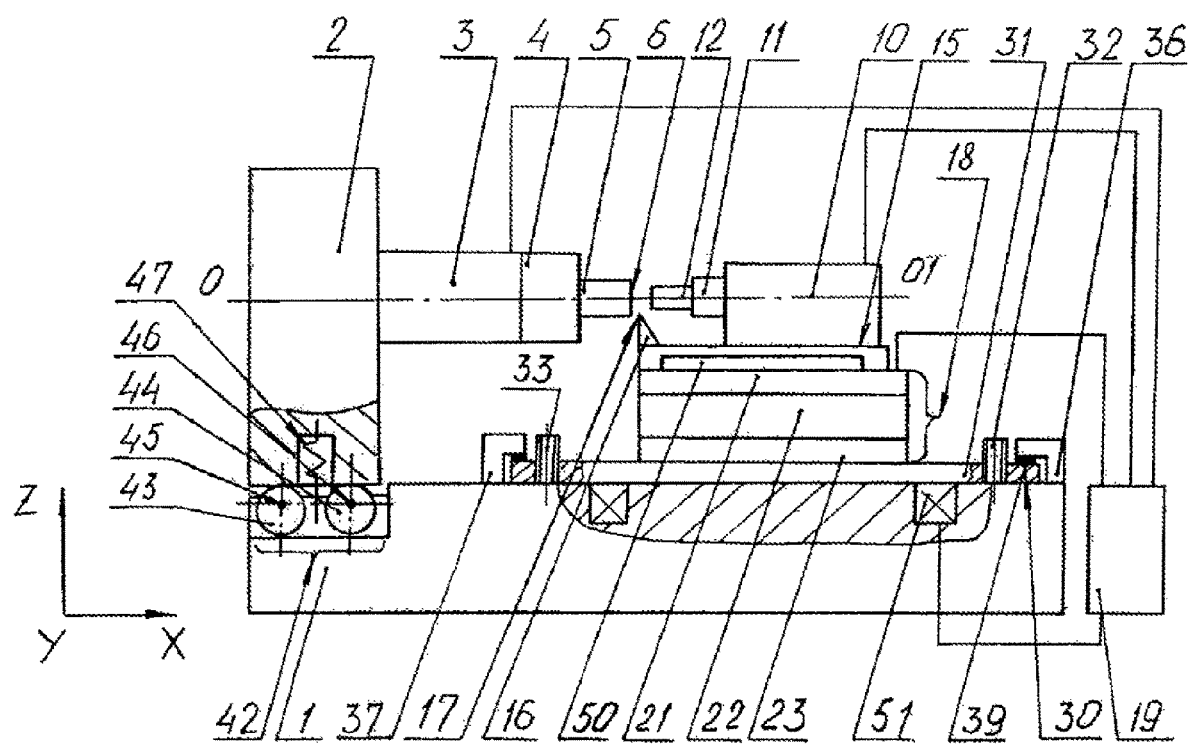
FIG. 1 shows a layout diagram of the scanning probe microscope combined with a device for modifying an object.

A widefield scanning probe microscope combined with a device for modifying and object comprises the base 1 on which are mounted a piezo scanner unit 2 with piezo scanner 3 having a longitudinal axis 0-01, disposed along a first coordinate X. Most often a piezoceramic tube with electrodes on the inner and outer surfaces is used as the piezo scanner 3. Here the piezoceramic tube (piezo scanner 3) is secured at one end on a fixed element (piezo scanner unit 2), and at its other end by means of bends along the second coordinate Y and along the third coordinate Z is possible to implement scanning closer to the plane YZ and simultaneously to implement movement along the first coordinate X due to expansion for example of part of the piezoceramic tube. Most frequently tubes from the Physik Instrumente Co. (Germany) are used as the piezoceramic tubes, for example PT 230.24 and PT 230.14. Mounted on the piezo scanner 3 is the object holder 4 with object 5 having a measurement surface 6 which is disposed in the plane of the second coordinate Y and third coordinate Z. Thus the piezo scanner 3 implements scanning of the measurement surface 6 of the object 5 closer to the plane YZ and simultaneously implements its movement along the first coordinate X. The widefield scanning probe microscope combined with device for modifying an object also comprises a probe unit 10 with probe holder 11 in which the probe 12 is secured which has the capability of interacting with the measurement surface 6 of the object 4. The probe 12 can be a quartz resonator with blade (not shown) which is traditionally used in probe microscopy. In this case the probe unit 10 usually includes of preamplifier of the primary signal. In this configuration when scanning is implemented during measurement, by the object 4, the probe 12 can also be a cantilever which is traditionally used in probe microscopy (a flexible arm with point at the free end (not shown)). In this case the probe unit 10 will be an optical tracking system of the cantilever movement. The widefield scanning probe microscope combined with a device for modifying an object also comprises a punch unit 15 with punch 16 having a cutting edge 17 which is disposed along the second coordinate Y. The punch 16 traditionally in micro-cutting is a diamond knife. Also traditionally in micro-cutting a mechanical punch holder is used as the punch unit 15. The punch unit 15 is mounted on the punch drive 18 wherein the cutting-edge 17 as the capability of interacting with the object 5. The punch drive 18 is a three-coordinate drive and provides movement along the first coordinate X, the second coordinate Y, and the third coordinate Z. The probe unit 10 is mounted on the punch drive 18.

In one of the variants the punch drive 18 includes a first movement module 21 along the first coordinate X, a second movement module 22 along the second quarter med Y, and a third movement module 23 along a third coordinate Z mounted with the capability of disconnecting from one another. The first movement module 21 along the first coordinate X and the second movement module 22 along the second coordinate Y can be, for example, linear piezo stages series P-611.1 from the Physik Instrumente Co. (Germany), while the third movement module 23 along the third coordinate Z can be a linear piezo stage series P-611.Z of the Physik Instrumente Co. (Germany). Disconnection of the first movement module 21 along the first coordinate X, the second movement on 222 on the second coordinate Y, and the third movement module 23 along the third coordinate Z can be implemented using their standard fastening elements.

In one of the variants a first turning module in the plane of coordinates XZ, mounted on the base 1 is incorporated in the widefield scanning probe microscope combined with the device for modifying an object. The punch drive 18 is secured on the first turning module in the plane of coordinates XZ 30. The first turning module in the plane of coordinates XZ comprises a platform 31 in which the first screws 32 and second screws 33 are mounted and have the capability of interacting with the base 1. In a preferred variant it is helpful to use two first screws 32 and two second screws 33, spaced apart along the coordinate X. Here the two first screws 32 are separated from one another along the second coordinate Y. The two second screws 33 are also separated from one another along the second coordinate Y (not sure). The platform 31 is pressed against the base 1 by the first bracket 36 and second bracket 37 through elastic elements 39 which are made of viton for example.

In one of the variants the piezo scanner unit 2 has the capability of turning the piezo scanner 3 in the plane of coordinates XZ. This can be implemented by the second turning module in the plane of coordinates XZ 42, namely by turning the first eccentric 43 and second eccentric 44 respectively about their axes of rotation 45 and 46. The piezo scanner unit 2 is pressed against the first eccentric 43 and the second eccentric 44 by the spring 47, one end of which is secured in the base 1 while the other end is secured in the piezo scanner unit 2.

In one of the variants the magnetic insert 50 mounted in the punch unit 15 and the electromagnet 51 mounted on the base 1 are incorporated in the widefield scanning probe microscope combined with the device for modifying an object. Here the magnetic insert 50 is coupled by a magnetic field to the electromagnet 51. A plate made of alloy SmCo can be used as the magnetic insert 50.

The piezo scanner 3, probe unit 10, punch drive 18, and electromagnet 51 are connected to the control unit 19.

Figure 6:
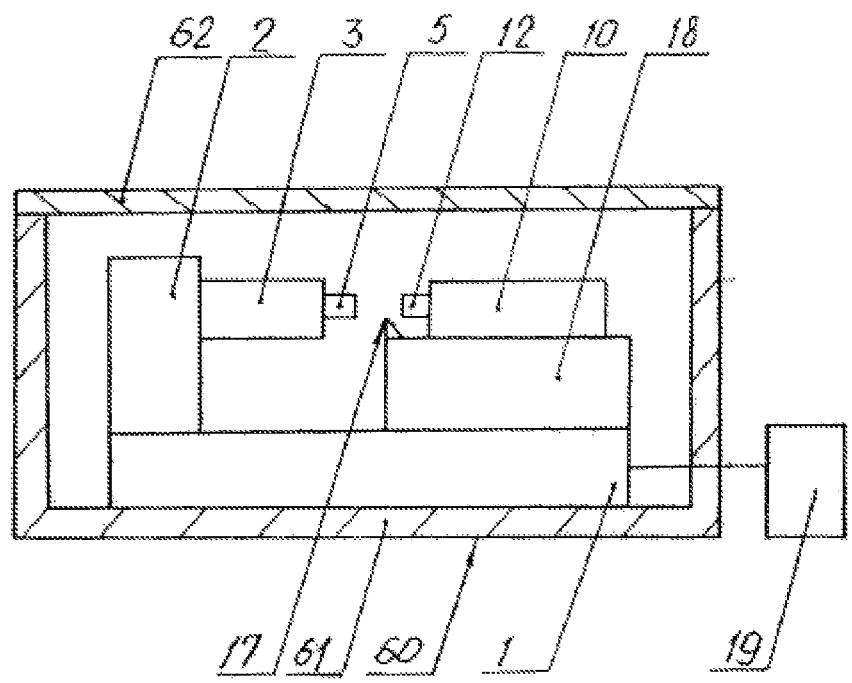
FIG. 6 shows a variant in which the device is disposed within a cryogenic chamber.

In one of the variants the base 1 with elements disposed on it are arranged in the cryo chamber 60 (FIG. 6), which includes the housing 61 with cover 62 coupled to refrigerant delivery systems (not shown). The widefield scanning probe microscope combined with the device for modifying an object in its cryogenic version and its functioning in the cryo chamber 60 are described in more detail in [EP 2482080 A1, and RU 2282257].

The device operates as follows. The object 5 is secured on the object holder. For this purpose often an epoxide resin is used. The probe 12 is secured in the probe holder 11. Using the punch drive 18, namely the third movement module 23, the punch 16 is moved along the coordinate Z and the direction of the object 5 and it is cut, forming the measurement surface 6. In the process of cutting the object 5 it is possible to also use movement of the punch 16 by the second movement module 22 along the second coordinate Y so as to, for example supplements the linear cutting mode with a "sawing" mode, periodic movements along the second coordinate Y in both directions in order to more effectively cut hard inclusions in the object five. These hard inclusions must be identified before installation of the object 5 in the object holder 4. After this the punch drive 18, namely the second movement module 22 moves the punch 16 along the second coordinate Y in order to move it out of the interactions with the object 3. This removal can also be implemented by the punch drive 18 along the coordinate Z, namely by the third movement module 23, and the direction away from the object 5. Then using the punch drive 18, namely the first movement module 21 along the first coordinate X, the probe 12 is brought close to the measurement surface 6 of the object 5. After this the measurement surface 6 is scanned and examined. In one of the variants it is possible to reconfigure the punch drive 18 using operational disconnection of the first movement module 21 along the first coordinate X, the second movement module 22 along the second coordinate Y, and the third movement module 23 along the third coordinate Z. The variant depicted in FIG. 1 is most expedient when the measurement surface 6 has a large (more than 1 μm) variation in height (irregularities along the first coordinate X). In this case, if during examination of the measurement surface 6 a height irregularity is identified which exceeds the range of motion of the piezo scanner 3 along the first coordinate X, operational withdrawal of the probe 12 from the measurement surface 6 is possible. Here the first movement module 21 is used along the first coordinate X with each withdraws only three probe unit 10 without the additional mass of the second movement module 22 along the second coordinate Y and the third movement module 23 along the third coordinate Z, as if the arrangement of the first movement module 21 along the first coordinate X, the second movement module 22 along the second coordinate Y, and the third movement module 23 along the third coordinate Z were different than in FIG. 1.

Figure 2:
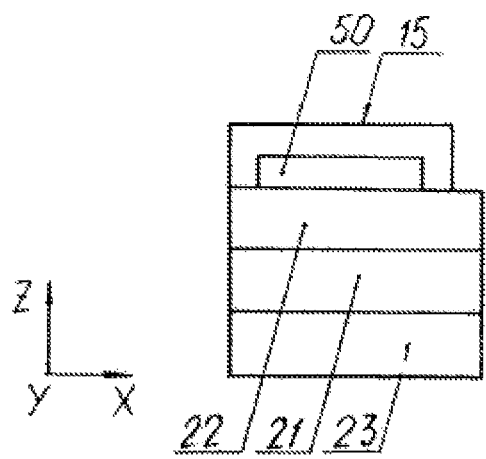
FIG. 2 shows a variant of the configuration of the punch drive for examining primarily horizontal objects.
Figure 3:
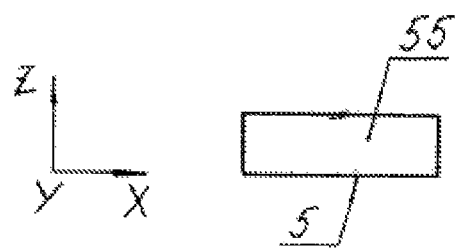
FIG. 3 shows the measurements on the measurement surface of a horizontal object.

If the second movement module 22 along the coordinate Y is placed at the site of the first movement module 21 along a first coordinate X (FIG. 2), it becomes possible to optimally study objects elongated along the second coordinate Y with the formation of the scanning zone 55 which is depicted in FIG. 3. Here the second movement module 2 along the second coordinate Y is used, which moves on leave the probe unit 10 without the additional mass of the first movement module 2 along the first coordinate X and the third movement module 23 along the third coordinate Z.

Figure 4:
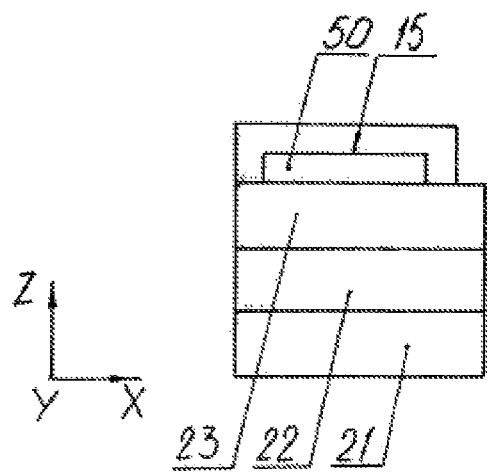
FIG. 4 shows a variant of the configuration of the punch drive for examining primarily vertical objects.
Figure 5:
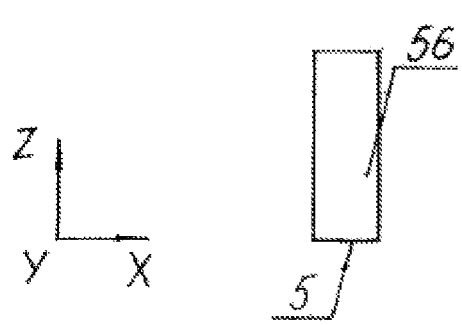
FIG. 5 shows the measurements on the measurement surface of a vertical object.

If the third movement module 23 along the third coordinate Z is placed on the site of the first movement module 21 along the first coordinate X (FIG. 4), it becomes possible to optimally study objects elongated along the third coordinate Z with formation of the scanning zone 56 depicted in FIG. 5. Here the third movement module 23 along the third coordinate Y is used, which moves only the probe unit 10 without the additional mass of the first movement module 21 along the first coordinate X and the second movement module 22 along the second coordinate Y.

In one of the variants in the proposed device a first turning module in the plane of the coordinates XZ mounted on the base 1 is used/using the first screws 32 and the second screws 33, due to the elastic elements 39 it is possible to set the necessary angle (in a range of +/−5°) of the probe 12 and punch 16 with respect to the object 5. In this case it becomes possible to form of the object 5 in the necessary direction. This can be helpful if the irregularities of interest are arranged at an unknown depth. Cutting at an angle with respect to the axis 0-01 can speed up the search for the zone of irregularity. By using the second turning module in the plane of coordinates XZ 42, the piezo scanner unit 2 has the capability of turning the piezo scanner 3 in the plane of coordinates XZ. The first eccentric 43 and the second eccentric 44 are rotated and the piezo scanner unit 2 is arranged at an angle to the axis 0-01 in a range of +/−10°.

The use of the electromagnetic 51 in conjunction with the magnetic insert 50 makes it possible to press the punch unit 15 against the base 1, minimizing the time delay between the punch unit 15, the first movement module 21 along the first coordinate X, the second movement module 22 along the second coordinate Y, the third movement module 23 along the third coordinate Z, and the first turning module in the plane of coordinates XZ 30. In this case in the process of cutting the object 5 it is possible to implement this compression and to improve the quality of the measurement surface 6. It is also possible to implement the compression during scanning and examination of the measurement surface 6, which reduces the non-functional movements of the probe 12 in the process of measurement.

The fact that the punch drive 18 is a three-coordinate drive and provides movement along the first coordinate X, the second coordinate Y, and the third coordinate Z, and implements actions of the punch 16 on the sample 5 strictly in the direction of the coordinate Z increases the quality of cutting of the measurement surface 6 and resolution of the measurements. The fact that the probe unit 10 is mounted on the probe drive 18 exit possible, in the process of measurement, in addition to moving the piezo scanner 3 along the first coordinate acts, along the second coordinate Y, and the third coordinate Z, to use additional movements of the punch drive 18 along the first coordinate X, the second coordinate Y, and the third coordinate Z. in this case is possible to use piezo scanner 3 with a reduced range of motion along the first coordinate X, the second coordinate Y, and the third coordinate Z with accordingly higher resonance frequency. Here the resolution of measurements is raised.

The fact that the punch drive 18 includes the first movement module 21 along the first coordinate X, the second movement module 22 along the second coordinate Y, and the third movement module 23 along the third coordinate Z, mounted with the capability of disconnecting from one another makes it possible for them to change places during examination of different objects. The module which is most frequently used in studying the measurement surface 6 the object 5 should be disposed closer along the coordinate Z to the object 5. This will make it possible to raise the resolution of the measurements.

The fact that the first turning module in the plane of coordinates XZ 30 mounted on the base 1, is incorporated in the device, the punch drive 18 is secured on the first turning module in the plane of coordinates XZ 30, wherein the piezo scanner units 2 has the capability of turning the piezo scanner 3 in the place of coordinates XZ 30 due to the second turning module in the plane of coordinates XZ 42 ensures the capability of cutting the object 5 at an angle to the axis 0-01, which raises the information level of the studies. Here it becomes possible to set the probe 12 perpendicular to the measurement surface 6, which raises resolution of the measurements.

The fact that the magnetic insert 50, mounted in the punch unit 15 and the electromagnet 51 mounted on the base 1, wherein the magnetic insert 50 is coupled by the magnetic field to the electromagnet 51 ensures the minimization of play in the punch drive 18. This raises the cutting quality of the object 5, raises the quality of the measurement surface 6, reduces non-functional movements in the process of examination of the measurement surface 6, and raises the resolution of measurements.

The invention claimed is:

1. A scanning probe microscope combined with a device for modifying the surface of an object and scanning, comprising a base, on which are mounted a piezo scanner unit with piezo scanner having the longitudinal axis 0-01, disposed along the first coordinate X, wherein an object holder is secured on the piezo scanner with object, which has a measurement surface disposed in the plane of the second coordinate Y and third coordinate Z, also containing a probe unit with probe holder, in which a probe is secured which has the capability of interacting with the measurement surface of the object, a punch unit with punch also being mounted on the base and having a cutting edge arranged on a punch drive, wherein the cutting edge is disposed along the second coordinate Y and has the capability of interacting with the object, the piezo scanner having the capability of moving the object holder along the first coordinate X, along the second coordinate Y, and along the third coordinate Z, and provides scanning of the object in the plane of the second coordinate Y and third coordinate Z, as well as its movement along the coordinate X, characterized in that the punch drive is a three-coordinate drive and provides movement of the punch along the first coordinate X, along the second coordinate Y, and along the third coordinate Z, and the probe unit is mounted on the punch drive.

2. The device according to claim 1, characterized in that the punch drive includes the first movement module along the first coordinate X, the second module along the second coordinate Y, and the third movement module along the third coordinate z mounted with the capability of disconnecting from one another.

3. The device according to claim 1, characterized in that a turning module in the plane of coordinates XZ mounted on the base is incorporated in it, the punch drive being secured on the first turning module in the plane of coordinates XZ.

4. The device in accordance with claim 1 characterized in that the piezo scanner unit is mounted on the base with the capability of adjustment movement, which is provided by the second turning module in the plane of coordinates XZ.

5. The device according to claim 1 characterized in that the magnetic insert, mounted in the pusher unit, and the electromagnet mounted on the base are incorporated in it, wherein the magnetic insert is coupled by the magnetic field to the electromagnet.

* * * * *